United States Patent [19]

Hoshino et al.

[11] Patent Number: 5,256,763

[45] Date of Patent: Oct. 26, 1993

[54] PROCESS FOR PRODUCTION OF POLY(ARYLENE THIOETHER) COPOLYMER

[75] Inventors: Mitsuru Hoshino; Yukichika Kawakami; Takayuki Katto, all of Iwaki, Japan

[73] Assignee: Kureha Kagaku Kogyo K.K., Tokyo, Japan

[21] Appl. No.: 797,869

[22] Filed: Nov. 26, 1991

[30] Foreign Application Priority Data

Dec. 13, 1990 [JP] Japan .................. 3-410082

[51] Int. Cl.$^5$ .................. C08G 63/68; C08G 75/00
[52] U.S. Cl. .................. 528/364; 528/388
[58] Field of Search .................. 528/364, 388

[56] References Cited

U.S. PATENT DOCUMENTS

| | | | |
|---|---|---|---|
| 4,125,525 | 11/1978 | Campbell | 528/388 |
| 4,371,671 | 2/1983 | Anderson | 528/388 |
| 4,645,826 | 2/1987 | Iizuka et al. | 528/388 |
| 4,848,190 | 7/1989 | Inoue et al. | 528/388 |
| 4,910,294 | 3/1990 | Ogata et al. | 528/388 |
| 5,037,953 | 8/1991 | Inoue et al. | 528/388 |

FOREIGN PATENT DOCUMENTS

| | | |
|---|---|---|
| 0166368 | 1/1986 | European Pat. Off. . |
| 0302218 | 2/1989 | European Pat. Off. . |
| 0344977 | 12/1989 | European Pat. Off. . |
| 59-219332 | 12/1984 | Japan . |
| 2207366 | 9/1987 | Japan .................. 528/388 |
| 63-305131 | 12/1988 | Japan . |

OTHER PUBLICATIONS

European Search Report (Nov. 13, 1992).

*Primary Examiner*—John C. Bleutge
*Assistant Examiner*—Helen F. Lee
*Attorney, Agent, or Firm*—Lowe, Price, LeBlanc & Becker

[57] ABSTRACT

Disclosed herein is a process for the production of a granular poly(arylene thioether) copolymer by polymerizing an alkali metal sulfide with dihalo-aromatic compounds including at least one dihalo-aromatic carboxylic acid in a polar solvent containing water. Upon the polymerization, at least a part of the dihalo-aromatic carboxylic acid is converted into an alkaline earth metal salt in advance, the hydroxide and/or oxide of an alkaline earth metal is added together with the dihalo-aromatic carboxylic acid to the polymerization reaction system, or the hydroxide and/or oxide of an alkaline earth metal is added together with an alkaline earth metal salt of the dihalo-aromatic carboxylic acid and the dihalo-aromatic carboxylic acid to the polymerization reaction system.

7 Claims, No Drawings

PROCESS FOR PRODUCTION OF POLY(ARYLENE THIOETHER) COPOLYMER

FIELD OF THE INVENTION

This invention relates to a process for producing a poly(arylene thioether) copolymer containing carboxyl groups, and more specifically to a process for producing a poly(arylene thioether) copolymer containing carboxyl groups or their metal salts (carboxylates) in the form of granules.

BACKGROUND OF THE INVENTION

Poly(arylene thioether) (hereinafter abbreviated as "PATE") represented by poly(phenylene sulfide) (hereinafter abbreviated as "PPS") is used, as a polymer excellent in heat resistance, chemical resistance, etc., in parts for electronic equipment and automobile parts and in a wide variety of other fields. By the way, a carboxyl-containing PATE is not only useful in itself as materials for various kinds of molded or formed products but also expectable to improve adhesion properties. Moreover, it is expected to have wide applications, for example, as compatibilizers upon blending PATE with other engineering plastics, or in production of ionomer resins or preparation of various kinds of derivatives making use of its carboxyl groups There has heretofore been proposed a production process of a copolymer, which comprises polymerizing dihalo-aromatic compounds including a dihalo-aromatic carboxylic acid with an alkali metal sulfide in the presence of a polar solvent substantially free of any water (Japanese Patent Application Laid-Open No. 305131/1988). However, the present inventors made an investigation with respect to this process and found that the copolymer can be obtained only in the form of powder, and difficulties are encountered on the provision of a copolymer having a sufficiently high molecular weight. In particular, the fine powdered copolymer involves problems of difficulties in its separation and purification from a reaction system upon the production, and of the worsening of labor hygiene and environmental contamination due to flying of the fine powder upon its forming or molding and processing, or of its poor handling properties. Such a copolymer is hence impractical.

On the other hand, it has been proposed to produce a high-molecular weight PATE in the form of granules by subjecting an alkali metal sulfide and at least one dihalo-aromatic compound to two-step polymerization in the presence of water in an amount specifically controlled in an organic amide solvent (U.S. Pat. No. 4,645,826). However, the present inventors made an investigation with respect to this two-step process and found that when polymerization is carried out by using, as said at least one dihalo-aromatic compound, a mixture of a dihaloaromatic compound free of any carboxyl group and a dihaloaromatic carboxylic acid, a copolymer in the form of granules can be obtained in the case where the proportion of the dihalo-aromatic carboxylic acid is extremely small, but only a copolymer in the form of fine powder can be obtained as its proportion becomes larger.

OBJECTS AND SUMMARY OF THE INVENTION

It is an object of this invention to provide a process for producing a granular PATE copolymer containing carboxyl groups and/or their metal salts (carboxylates).

The present inventors have carried out an extensive investigation with a view toward overcoming the above-described problems of the prior art. As a result, it has been found that a granular PATE copolymer can be obtained by upon the reaction of an alkali metal sulfide with dihalo-aromatic compounds in a polar solvent containing water to produce a poly(arylene thioether) copolymer, using, as the dihalo-aromatic compounds, a dihalo-aromatic compound free of any carboxyl group and a dihalo-aromatic carboxylic acid containing 1-2 carboxyl groups, and (1) converting the whole or part of the dihalo-aromatic carboxylic acid into an alkaline earth metal salt in advance to add the salt to a polymerization reaction system, (2) adding at least one compound selected from the group consisting of the hydroxides and oxides of alkaline earth metals together with the dihalo-aromatic carboxylic acid to the polymerization reaction system or (3) adopting a combined process of these processes, even when the proportion of the dihalo-aromatic carboxylic acid to be copolymerized is relatively high.

Besides, as a polymerization process, it may be preferable to use substantially the same process as the two-step polymerization process described in U.S. Pat. No. 4,645,826. It may further be preferable to wash the resultant copolymer with acidic or neutral water after completion of the polymerization reaction.

The present invention has been led to completion on the basis of these findings.

According to the present invention, there is thus provided a process for the production of a granular poly(arylene thioether) copolymer by reacting an alkali metal sulfide with dihalo-aromatic compounds in a polar solvent containing water, which comprises using, as the dihalo-aromatic compounds, 98-70 mole % of a dihaloaromatic compound free of any carboxyl group and 2-30 mole % of a dihalo-aromatic carboxylic acid containing 1-2 carboxyl groups and performing polymerization by adding the dihalo-aromatic carboxylic acid to a polymerization reaction system in accordance with one process selected from the following processes:

(1) at least a part of the dihalo-aromatic carboxylic acid is converted into an alkaline earth metal salt in advance to add the salt to the polymerization reaction system;

(2) at least one compound selected from the group consisting of the hydroxides and oxides of alkaline earth metals is added together with the dihalo-aromatic carboxylic acid to the polymerization reaction system; and (3) at least one compound selected from the group consisting of the hydroxides and oxides of alkaline earth metals is added together with a mixture of an alkaline earth metal salt of the dihalo-aromatic carboxylic acid, which has been prepared in advance, and the dihaloaromatic carboxylic acid to the polymerization reaction system.

DETAILED DESCRIPTION OF THE INVENTION

Features of the present invention will hereinafter be described in detail.

Dihalo-aromatic compound

In the present invention, a dihalo-aromatic compound free of any carboxyl group and a dihalo-aromatic carboxylic acid containing 1-2 carboxyl groups (both compounds will hereinafter be called "the whole dihalo-aromatic compound" collectively) are used as the dihalo-aromatic compounds.

As exemplary dihalo-aromatic compounds free of any carboxyl group to be used in the present invention, may be mentioned dihalogen-substituted benzenes such as p-dihalobenzenes and m-dihalobenzenes; dihalogen-substituted alkylbenzenes such as 2,3-dihalotoluenes, 2,4-dihalo-toluenes, 2,6-dihalotoluenes, 3,4-dihalotoluenes and 2,5-dihalo-p-xylenes; dihalogen-substituted arylbenzens such as 1-phenyl-2,5-dihalobenzenes; dihalogen-substituted biphenyls such as 4,4'-dihalobiphenyls; dihalogen-substituted naphthalenes such as 2,6-dihalonaphthalenes and 1,5-dihalonaphthalenes; and the like.

Halogen elements in these dihalo-aromatic compounds may be fluorine, chlorine, bromine or iodine and may be identical or different from each other. Among the abovementioned dihalo-aromatic compounds, dihalobenzenes are preferred in view of their availability an physical properties of copolymers to be obtained. p-Dichlorobenzene is particularly preferred. These dihalo-aromatic compounds may be used either singly or in combination.

As exemplary dihalo-aromatic carboxylic acids, may be mentioned dihalobenzoic acids such as 2,3-dihalobenzoic acids, 2,4-dihalobenzoic acids, 2,5-dihalobenzoic acids, 2,6-dihalobenzoic acids, 3,4-dihalobenzoic acids and 3,5-dihalobenzoic acids; monocarboxyl-substituted compounds of dihalonaphthalenes such as 2,6-dihalonaphthalenes and 1,4-dihalonaphthalenes; monocarboxyl- or dicarboxyl-substituted compounds of dihalobiphenyls such as 4,4'-dihalobiphenyls, 3,4'-dihalobiphenyls, 2,4'-dihalo-biphenyls, 2,3'-dihalobiphenyls, 3,3'-dihalobiphenyls and 2,2'-dihalobiphenyls; monocarboxyl- or dicarboxyl-substituted compounds of dihalo-aromatic compounds with their biphenyl group replaced by a diphenyl ether, diphenyl thioether, diphenyl sulfoxide, diphenyl sulfone, diphenylmethane or 2,2'-diphenylpropane group; and the like.

Halogen elements in these dihalo-aromatic carboxylic acids may be fluorine, chlorine, bromine or iodine and may be identical or different from each other. These dihalo-aromatic carboxylic acids may be used either singly or in combination. Among the above-mentioned dihalo-aromatic carboxylic acids, dihalobenzoic acids are particularly preferred in view of their availability and physical properties of copolymers to be obtained.

In this invention, 98-70 mole % of the dihalo-aromatic compound free of any carboxyl group and 2-30 mole % of the dihalo-aromatic carboxylic acid containing 1-2 carboxyl groups are used. If the proportion of the dihalo-aromatic carboxylic acid is too small, the effect of the present invention owing to the introduction of carboxyl groups becomes insufficient. When the proportion of the dihalo-aromatic carboxylic acid is extremely small, a granular copolymer can be obtained without using the process of this invention, for example, so long as the known two-step polymerization process described in U.S. Pat. No. 4,645,826 is used. Any proportions exceeding 30 mole % will result in a copolymer liable to lump in the course of the polymerization, and lower the yield of the granular product. It is hence preferable to use 97-75 mole % of the dihalo-aromatic compound free of any carboxyl group and 3-25 mole % of the dihalo-aromatic carboxylic acid containing 1-2 carboxyl groups.

A molecular weight modifier such as a trihalobenzene or dihaloaniline may optionally be used in combination with a view toward controlling the molecular weight of the resulting copolymer. (Alkaline earth metal, and oxide and hydroxide thereof)

As exemplary alkaline earth metal salts of dihalo-aromatic carboxylic acids to be used in the present invention, may be mentioned Be, Mg, Ca, Sr and Ba salts of the dihalo-aromatic carboxylic acids. These carboxylates may be used either singly or in combination.

As exemplary hydroxides of alkaline earth metals to be used in the present invention, may be mentioned $Be(OH)_2$, $Mg(OH)_2$, $Ca(OH)_2$, $Sr(OH)_2$ and $Ba(OH)_2$. On the other hand, as exemplary oxides of alkaline earth metals, may be mentioned BeO, MgO, CaO, SrO and BaO. These hydroxides or oxides may be used either singly or in combination.

Alkali metal sulfide

The alkali metal sulfides to be used in the present invention include, for example, lithium sulfide, sodium sulfide, potassium sulfide, rubidium sulfide and cesium sulfide. These alkali metal sulfides can be used in anhydrous forms, or as hydrates or aqueous mixtures. In addition, an alkali metal sulfide prepared in situ from an alkali metal hydrosulfide is also included in the alkali metal sulfides mentioned herein. These alkali metal sulfides may be used either singly or in combination.

Polar solvent

The polar solvent to be used in the present invention is preferably an aprotic polar solvent stable to alkali at a high temperature. As specific examples of the polar solvent, may be mentioned amide compounds such as N,N-dimethylformamide and N,N-dimethylacetamide; N-alkyl- or N-cycloalkyl-lactams such as N-methyl-ε-caprolactam, N-methylpyrrolidone and N-cyclohexyl-pyrrolidone; N,N-dialkylimidazolidinone compounds such as 1,3-dimethyl-2-imidazolidinone; tetraalkylureas such as tetramethylurea; hexaalkylphosphoric triamides such as hexamethylphosphoric triamide; and the like. These solvents may be used either singly or in combination.

Polymerization process

In this invention, a process in which the alkali metal sulfide is reacted with the dihalo-aromatic compounds in the polar solvent containing water to produce a poly(arylene thioether) copolymer is used as a basic polymerization process. In order to obtain a PATE copolymer containing carboxyl groups and/or carboxylates in the form of granules, however, the whole or part of the dihalo-aromatic carboxylic acid is used as an alkaline earth metal salt, the dihalo-aromatic carboxylic acid and the hydroxide and/or oxide of the alkaline earth metal are added to the polymerization reaction system, or a combined process of these processes is adopted.

(1) In the case where the process in which at least a part of the dihalo-aromatic carboxylic acid is converted into an alkaline earth metal salt in advance to add the salt to the polymerization reaction system is used, the whole amount of the dihalo-aromatic carboxylic acid to be charged is preferably converted into the alkaline earth metal salt in advance to add the salt to the polymerization reaction system. However, a part of the carboxylic acid may be added as it is. In this case, it is preferred that at least 50 mole % of the charged amount of the dihalo-aromatic carboxylic acid is converted into the alkaline earth metal salt in advance, and the proportion of the dihalo-aromatic carboxylic acid unconverted into the alkaline earth metal salt (hereinafter may called "unneutralized carboxylic acid") to be added to the reaction system is controlled to less than 2 mole % of the whole dihalo-aromatic compound.

Namely, when the proportion of the dihalo-aromatic carboxylic acid to the whole dihalo-aromatic compound is as relatively small as 2-4 mole %, a granular copolymer can be obtained so long as at least 50 mole % of the carboxylic acid is converted into the alkaline earth metal salt. When the proportion of the carboxylic acid is as great as more than 4 mole % to not more than 30 mole % on the other hand, the proportion of the unneutralized carboxylic acid is controlled to less than 2 mole % of the whole dihalo-aromatic compound. Besides, when the dihalo-aromatic carboxylic acid is a dicarboxylic acid having 2 carboxyl groups, it is preferred that the proportion of the unneutralized carboxylic acid is controlled to less than 1 mole % of the whole dihalo-aromatic compound.

(2) In the case where at least one compound selected from the group consisting of the hydroxides and oxides of alkaline earth metals is added together with the dihalo-aromatic carboxylic acid to the polymerization reaction system, an alkaline earth metal salt of the dihalo-aromatic carboxylic acid is formed in the reaction system. In this case, it is preferred that at least one compound selected from the group consisting of the hydroxides and oxides of alkaline earth metals is added to the polymerization reaction system in such a stoichiometric amount that at least 50 mole % of the charged amount of the dihalo-aromatic carboxylic acid can be converted into an alkaline earth metal salt and that the proportion of the dihalo-aromatic carboxylic acid unconverted into the alkaline earth metal salt and existing in the reaction system becomes less than 2 mole % of the whole dihalo-aromatic compound.

Namely, when the proportion of the dihalo-aromatic carboxylic acid to the whole dihalo-aromatic compound is as relatively small as 2-4 mole %, a granular copolymer can be obtained so long as the hydroxide and/or oxide of the alkaline earth metal is added to the reaction system in a stoichiometric amount sufficient to convert at least 50 mole % of the carboxylic acid into the alkaline earth metal salt. When the proportion of the carboxylic acid is as great as more than 4 mole % to not more than 30 mole % on the other hand, it is preferred that the hydroxide and/or oxide of the alkaline earth metal is added to the reaction system in such a stoichiometric amount that the proportion of the unneutralized carboxylic acid becomes less than 2 mole % of the whole dihalo-aromatic compound. Besides, when the dihalo-aromatic carboxylic acid is a dicarboxylic acid having 2 carboxyl groups, it is preferred that the hydroxide and/or oxide of the alkaline earth metal is added to the reaction system in such a stoichiometric amount that the proportion of the unneutralized carboxylic acid becomes less than 1 mole % of the whole dihalo-aromatic compound.

The term "stoichiometric amount" as used herein means an equivalent amount of an alkaline earth metal compound which neutralizes carboxyl groups of the dihalo-aromatic carboxylic acid. Therefore, the preferred aspect described above can be expressed by the following inequality:

$$[(b-2c)/(a+b)] \times 100 < 2$$

wherein a, b and c mean the numbers of moles of the dihalo-aromatic compound free of any carboxyl group, the dihalo-aromatic carboxylic acid and the alkaline earth metal compound, respectively.

When the dihalo-aromatic carboxylic acid is a dicarboxylic acid, consideration is given according to the number of carboxyl groups.

It is also particularly preferred that the amount of the hydroxide and/or oxide of the alkaline earth metal to be added is such a proportion that the whole amount of the carboxyl groups in the dihalo-aromatic carboxylic acid is converted into the alkaline earth metal salt. In that case, the proportion may also be stoichiometrically at least one equivalent to the carboxyl groups.

(3) In the case where at least one compound selected from the group consisting of the hydroxides and oxides of alkaline earth metals is added together with an alkaline earth metal salt of the dihalo-aromatic carboxylic acid, which has been prepared in advance, and the dihalo-aromatic carboxylic acid to the polymerization reaction system, it is preferred that the hydroxide and/or oxide of the alkaline earth metal is added so as to become substantially the same conditions as those of the above-described process (2). In this case, the stoichiometric amount of the hydroxide and/or oxides of the alkaline earth metal, in which at least 50 mole % of the charged amount of the dihalo-aromatic carboxylic acid can be converted into an alkaline earth metal salt, is calculated including the alkaline earth metal salt previously added in such an alkaline earth metal salt.

In this invention, the dihalo-aromatic carboxylic acid or salt thereof is generally added together with the dihalo-aromatic compound to the polymerization reaction system. If necessary, it may however be added together with compounds other than the dihalo-aromatic compound to the polymerization reaction system to heat them, followed by the addition of the dihalo-aromatic compound to initiate polymerization.

In this invention, it is desirable to control the proportion of the whole dihalo-aromatic compound within the range of generally 0.7-1.3 moles, preferably 0.9-1.1 moles per mole of the alkali metal sulfide. Any amounts outside the above range make it difficult to obtain a high-molecular weight copolymer.

No particular limitation is imposed on the amount of the polar solvent used. However, the polar solvent is generally used in such a range that the number of total moles of the whole dihalo-aromatic compound is 0.1-5 moles, preferably 0.5-3.5 moles per kg of the polar solvent.

In this invention, the polymerization reaction is carried out in the polar solvent containing water. The water is used in a range of generally 0.5-30 moles, preferably 1-25 moles per kg of the polar solvent. A portion of this water may be added in the course of the polymerization reaction. When hydrated alkali metal sulfide is used, the water content may also be controlled by conducting a dehydration operation by azeotropic distillation or the like, as needed. Any water contents less than 0.5 mole or higher than 30 moles involve a potential problem that an undesirable side reaction or the like tends to occur, and make it difficult to obtain a high-molecular weight copolymer.

The polymerization reaction is carried out at a temperature ranging generally from 150° to 300° C., preferably from 180° to 280° C. for generally 0.5-30 hours, preferably 1-20 hours in an inert gas atmosphere such as nitrogen or argon. Any reaction temperatures lower than 150° C. is accompanied by a potential problem that the polymerization reaction becomes insufficient. On the contrary, any reaction temperatures exceeding 300° C. involve a potential danger that a decomposition reaction may occur. If the polymerization time is shorter than 0.5 hour, there is a potential problem that the polymerization reaction becomes insufficient. On the other hand, if the polymerization time is longer than 30 hours, the productivity becomes deteriorated.

In this invention, the polymerization reaction may also be conducted by heating up the reaction mixture in two or more multi-steps. As a specific example, may be mentioned a process in which a polymerization reaction is conducted in the following at least two steps in accordance with the process described in U.S. Pat. No. 4,645,826.

First step

A step comprising conducting a reaction in the presence of water in a proportion of 0.5-2.4 moles per mole of the alkali metal sulfide charged at a temperature of 180°-235° C. until the conversion of the whole dihalo-aromatic compound becomes 50-98 mole %.

Second step

A step comprising adding water in such a manner that the water content becomes 2.5-7.0 moles per mole of the alkali metal sulfide charged, and raising the temperature to 245-290° C. to continue the reaction.

In the first step, the polymerization reaction is generally conducted for 0.5-20 hours, whereby the conversion of the whole dihalo-aromatic compound can be controlled to 50-98 mole %. In the second step, the polymerization is generally carried out for 0.5-15 hours, whereby the conversion of the whole dihalo-aromatic compound is further enhanced to increase the melt viscosity of the resulting copolymer. According to this two-step polymerization process, a copolymer higher in molecular weight and excellent in melt stability can be obtained in a shorter period of time.

In the present invention, a basic compound may optionally be added to the polymerization reaction system to keep the system alkaline prior to the polymerization reaction. As such a basic compound, may be mentioned at least one compound selected from the hydroxides and oxide of alkali metals.

After completion of the polymerization reaction, the resulting PATE copolymer can be washed with acidic or neutral water. The washing with neutral water can result in a PATE copolymer containing carboxylates with an alkaline earth metal. On the other hand, the washing with acidic water can result in a PATE copolymer containing carboxyl groups instead of the carboxylates.

According to the production process of the present invention, a PATE copolymer can be obtained as granules which can be captured on a screen of 100 mesh when they are sifted by the screen.

ADVANTAGES OF THE INVENTION

According to the present invention, it is possible to produce a PATE copolymer containing carboxyl groups and/or carboxylates, which has been able to be obtained only as fine powder by the conventional process, in the form of granules. Therefore, the present invention has the following advantageous effects in addition to an advantage that the separation and purification of the copolymer upon its production become easy. Namely, the worsening of labor hygiene and environmental contamination due to flying of the fine powder upon its forming or molding and processing are improved, and the copolymer has excellent handling properties.

According to the present invention, it is also possible to obtain an ionomer resin containing an alkaline earth metal with ease. It is further possible to easily produce various kinds of ionomer resins by converting the carboxyl-containing PATE copolymer into salts with alkali metals, the copper group, the zinc group, the aluminum group, etc. other than alkaline earth metals in a solvent or in a molten state. Alternatively, the copolymer may be converted into another derivative by exchanging the carboxyl groups for ester groups, amide groups or the like.

The PATE copolymers obtained in accordance with the production process of this invention can be use either singly or as blends with other resins in a wide variety of application fields, for example, as injection-molded products, extruded products, films, sheets, sealing materials, fibers, etc.

EMBODIMENTS OF THE INVENTION

The present invention will hereinafter be described specifically by the following examples and comparative examples. It should however be borne in mind that this invention is not limited to the following examples only.

EXAMPLE 1

(1) Preparation of calcium di(3,5-dichlorobenzoate)

To 3000 g of water, 191 g (1 mole) of 3,5-dichlorobenzoic acid and 40 g (1 mole) of sodium hydroxide were added and dissolved in water with stirring. An aqueous solution with 56.6 g (0.51 mole) of calcium chloride dissolved in 500 g of water was then added dropwise to the first solution under stirring, thereby obtaining a precipitate having a white color. The thus-obtained precipitate was filtered, washed with water, dewatered and then dried under reduced pressure at room temperature to obtain calcium salt of 3,5-dichlorobenzoic acid as white fine powder. The calcium content of these salts was determined by ion chromatography and was found to be 9.7 wt. %. It was hence found that calcium di(3,5-dichlorobenzoate) accounted for about 100% of these salts.

(2) Polymerization reaction:

A titanium-lined autoclave was charged with 1500 g of N-methylpyrrolidone (hereinafter abbreviated as "NMP"), 504 g (3.00 moles, water content: 53.6 wt. %) of hydrated sodium sulfide and 10 g (0.13 mole) of calcium hydroxide. After the autoclave being purged with nitrogen, the contents were gradually heated up to 200° C. to distill off 560 g of an NMP solution containing 190 g of water, and 0.06 mole of hydrogen sulfide. Thereafter, 348 g (2.37 moles) of p-dichlorobenzene, 140 g [0.33 mole; 0.66 mole in terms of 3,5-dichlorobenzoic acid; in this case, equivalent ratio of calcium/carboxylic acid in the reaction system: 1.40] of the above-described calcium di(3,5-dichlorobenzoate) and 560 g of NMP were fed (water content/sodium sulfide: 1.5 moles/mole) to react the contents for 5 hours at 220° C. At this time, the conversion of the whole dihalo-aromatic compound was about 95%. Thereafter, 180 g (9.99 moles) of water was further introduced under pressure, and the resultant mixture was heated to 255° C. to react them for 4 hours.

The resulting reaction mixture was sifted by a screen of 100 mesh to separate a granular polymer. The polymer thus collected was washed with acetone and then immersed for 2 hours with stirring in acidic water whose pH was adjusted to 1. The thus-immersed polymer was then washed with water, dewatered and dried to obtain a polymer (Polymer 1) as white granules. The yield was found to be 45%.

In an infrared absorption spectrum on Polymer 1, an absorption was observed at 1700 cm$^{-1}$ which is an absorption band characteristic of carboxyl group. By ion chromatography, calcium was detected only by 80 ppm. From these results, it was confirmed that 3,5-dichlorobenzoic acid is copolymerized certainly and its carboxyl group exists in an acid form. The content of carboxylic component in Polymer 1 was 21.2 mole % as determined by oxygen analysis. The melting point (Tm) and glass transition temperature (Tg) of Polymer 1 were 253° C. and 99° C., respectively, as measured with respect to a sheet, which had been obtained by hot-pressing the polymer at 320° C. and then quenching the polymer thus hot-pressed, by means of a differential scanning calorimeter (DSC) at a heating rate of 10° C./min in a nitrogen atmosphere. The melt viscosity ($\eta^*$) of Polymer 1 was 5 poises as measured at 310° C. and a shear rate of 1,200 sec$^{-1}$ by means of a "Capirograph" (diameter: 0.5 mm).

Incidentally, values as to these characteristics and physical properties in the following examples and comparative examples were measured in exactly the same manner as in this example.

EXAMPLE 2

A titanium-lined autoclave was charged with 1500 g of NMP, 504 g (3.00 moles, water content: 53.6 wt. %) of hydrated sodium sulfide and 10 g (0.13 mole) of calcium hydroxide. After the autoclave being purged with nitrogen, the contents were gradually heated up to 200° C. to distill off 600 g of an NMP solution containing 190 g of water, and 0.06 mole of hydrogen sulfide. Thereafter, 392 g (2.67 moles) of p-dichlorobenzene, 70 g [0.17 mole; 0.34 mole in terms of 3,5-dichlorobenzoic acid; in this case, equivalent ratio of calcium/carboxylic acid in the reaction system: 1.81]of the above-described calcium di(3,5-dichlorobenzoate) and 600 g of NMP were fed. The resulting mixture was then subjected to the two-step polymerization and after-treatment in the same manner as in Example 1, thereby obtaining a polymer (Polymer 2) as white granules. The yield was found to be 80%.

In an infrared absorption spectrum on Polymer 2, an absorption was observed at 1700 cm$^{-1}$. By ion chromatography, calcium was detected only by 70 ppm. From these results, it was confirmed that 3,5-dichlorobenzoic acid is copolymerized certainly and its carboxyl group exists in an acid form. The content of carboxylic component in Polymer 2 was 10.7 mole % as determined by oxygen analysis.

Tm and Tg of Polymer 2 were 284° C. and 80° C., respectively. Its $\eta^*$ was 20 poises.

EXAMPLE 3

A titanium-lined autoclave was charged with 8000 g of NMP, 3360 g (19.99 moles, water content: 53.6 wt. %) of hydrated sodium sulfide and 60 g (0.81 mole) of calcium hydroxide. After the autoclave being purged with nitrogen, the contents were gradually heated up to 200° C. to distill off 2550 g of an NMP solution containing 1260 g of water, and 0.50 mole of hydrogen sulfide. Thereafter, 770 g (18.84 moles) of p-dichlorobenzene, 192 g (1.01 moles; in this case, equivalent ratio of calcium/carboxylic acid in the reaction system: 1.61) of 3,5-dichlorobenzoic acid and 3000 g of NMP were fed (water content/sodium sulfide: 1.5 moles/mole) to react the contents for 6 hours at 220° C. Thereafter, 1000 g (55.5 moles) of water was further introduced under pressure, and the resultant mixture was heated to 250° C. and then 255° C. to react them for 1 hour and 3 hours, respectively.

The resulting reaction mixture was treated in the same manner as in Example 1, thereby obtaining a polymer (Polymer 3) as white granules. The yield was found to be 65%.

In an infrared absorption spectrum on Polymer 3, an absorption was observed at 1700 cm$^{-1}$. By ion chromatography, calcium was detected only by 70 ppm. From these results, it was confirmed that 3,5-dichlorobenzoic acid is copolymerized certainly and its carboxyl group exists in an acid form. The content of carboxylic component in Polymer 3 was 4.8 mole % as determined by oxygen analysis Tm and Tg of Polymer 3 were 281° C. and 84° C., respectively. Its $\eta^*$ was 160 poises.

EXAMPLE 4

A titanium-lined autoclave was charged with 4000 g of NMP, 1680 g (9.99 moles, water content: 53.6 wt. %) of hydrated sodium sulfide and 20 g (0.27 mole) of calcium hydroxide. After the autoclave being purged with nitrogen, the contents were gradually heated up to 200° C. to distill off 1600 g of an NMP solution containing 630 g of water, and 0.20 mole of hydrogen sulfide. Thereafter, 1385 g (9.42 moles) of p-dichlorobenzene, 95.5 g (0.50 mole; in this case, equivalent ratio of calcium/carboxylic acid in the reaction system: 1.08) of 3,5-dichlorobenzoic acid and 1900 g of NMP were fed (water content/sodium sulfide: 1.5 moles/mole) to react the contents for 6 hours at 220° C. Thereafter, 500 g (27.7 moles) of water was further introduced under pressure, and the resultant mixture was heated to 255° C. to react them for 4 hours.

The resulting reaction mixture was sifted by a screen of 100 mesh to separate a granular polymer. The polymer thus collected was washed with acetone and then neutral water. The thus-washed polymer was then dewatered and dried to obtain a polymer (Polymer 4) as white granules. The yield was found to be 68%.

The amount of calcium detected from Polymer 4 was 8000 ppm. On the other hand, in an infrared absorption spectrum on Polymer 4, an absorption at 1700 cm$^{-1}$, which is an absorption band characteristic of carboxyl group, disappeared, and a shoulder near 1640 cm$^{-1}$ and an absorption near 1440 cm$^{-1}$, which correspond to an absorption band characteristic of carboxylate, were newly observed. From these results, it was confirmed that 3,5-dichlorobenzoic acid is copolymerized certainly and its carboxyl group substantially exists in the form of a calcium salt.

Tm and Tg of Polymer 4 were 276° C. and 90° C., respectively. Its η* was 4500 poises.

Comparative Example 1

Polymerization was conducted in the same manner as in Example 3 except that calcium hydroxide was not added.

When the resulting reaction mixture was sifted by a screen of 100 mesh, the whole amount of the reaction mixture passed through the screen and any polymer did not remain on the screen.

Comparative Example 2

Polymerization was conducted in the same manner as in Example 3 except that the amount of calcium hydroxide was changed from 60 g (0.81 mole) to 15.0 g (0.20 mole) and 16 g (0.40 mole) of sodium hydroxide was added.

When the resulting reaction mixture was sifted by a screen of 100 mesh, the whole amount of the reaction mixture passed through the screen and any polymer did not remain on the screen.

In this case, the equivalent ratio of calcium/carboxylic acid was 0.40 and the proportion of the carboxylic compound unneutralized stoichiometrically was 3 mole % based on the whole dihalo-aromatic compound.

EXAMPLE 5

A titanium-lined autoclave was charged with 8000 g of NMP, 3360 g (19.99 moles, water content: 53.6 wt. %) of hydrated sodium sulfide and 60 g (0.81 mole) of calcium hydroxide. After the autoclave being purged with nitrogen, the contents were gradually heated up to 200° C. to distill off 2400 g of an NMP solution containing 1260 g of water, and 0.50 mole of hydrogen sulfide. Thereafter, a mixed solution of 2640 g (18.00 moles) of p-dichlorobenzene, 384 g (2.01 moles; in this case, equivalent ratio of calcium/carboxylic acid in the reaction system: 0.81; proportion of the carboxylic compound unneutralized stoichiometrically to the whole dihalo-aromatic compound: 1.95 mole %) of 3,5-dichlorobenzoic acid and 3000 g of NMP was fed (water content/sodium sulfide: 1.5 moles/mole) to react the contents for 5 hours at 220° C. Thereafter, 1000 g (55.5 moles) of water was further introduced under pressure, and the resultant mixture was heated to 255° C. to react them for 3 hours.

The resulting reaction mixture was treated in the same manner as in Example 1, thereby obtaining a polymer (Polymer 5) as white granules. The yield was found to be 55%.

In an infrared absorption spectrum on Polymer 5, an absorption was observed at 1700 cm$^{-1}$, and calcium ions were detected only by 60 ppm. From these results, it was confirmed that 3,5-dichlorobenzoic acid is copolymerized certainly and its carboxyl group exists in an acid form. The content of carboxylic component in Polymer 5 was 9.5 mole % as determined by oxygen analysis.

Tm and Tg of Polymer 5 were 276° C. and 80° C., respectively. Its η* was 60 poises.

EXAMPLE 6

(1) Preparation of barium di(3,5-dichlorobenzoate)

Barium di(3,5-dichlorobenzoate) was obtained in the same manner as the preparation of calcium di(3,5-dichlorobenzoate) in Example 1 except that 106.2 g (0.51 mole) of barium chloride was used instead of 56.6 g of calcium chloride. The barium content of the resulting salts was determined by ion chromatography and was found to be 26.5 wt. %. It was hence found that barium di(3,5-dichlorobenzoate) accounted for about 100% of the salts.

(2) Polymerization reaction

Polymerization and after-treatment were conducted in the same manner as in Example 2 except that 86.2 g (0.17 mole) of barium di(3,5-dichlorobenzoate) was used instead of 70 g of calcium di(3,5-dichlorobenzoate), thereby obtaining a polymer (Polymer 6) as white granules. The yield was found to be 81%.

In an infrared absorption spectrum on Polymer 6, an absorption was observed at 1700 cm$^{-1}$. By ion chromatography, barium was detected only by 80 ppm. From these results, it was confirmed that 3,5-dichlorobenzoic acid is copolymerized certainly and its carboxyl group exists in an acid form. The content of carboxylic component in Polymer 6 was 10.8 mole % as determined by oxygen analysis.

Tm and Tg of Polymer 6 were 283° C. and 81° C., respectively. Its η* was 25 poises.

EXAMPLE 7

A titanium-lined autoclave was charged with 8000 g of NMP, 3360 g (19.99 moles, water content: 53.6 wt. %) of hydrated sodium sulfide and 56.1 g (1.00 mole) of calcium oxide. After the autoclave being purged with nitrogen, the contents were gradually heated up to 200° C. to distill off 2450 g of an NMP solution containing 1260 g of water, and 0.50 mole of hydrogen sulfide. Thereafter, 2770 g (18.84 moles) of p-dichlorobenzene, 192 g (1.01 moles; in this case, equivalent ratio of calcium/carboxylic acid in the reaction system: 1.99) of 3,5-dichlorobenzoic acid and 3000 g of NMP were fed (water content/sodium sulfide: 1.5 moles/mole) to react the contents for 6 hours at 220° C. Thereafter, 1000 g (55.5 moles) of water was further introduced under pressure, and the resultant mixture was heated to 255° C. to react them for 4 hours.

The resulting reaction mixture was treated in the same manner as in Example 1, thereby obtaining a polymer (Polymer 7) as white granules. The yield was found to be 63%.

In an infrared absorption spectrum on Polymer 7, an absorption was observed at 1700 cm$^{-1}$. By ion chromatography, calcium was detected only by 65 ppm. From these results, it was confirmed that 3,5-dichlorobenzoic acid is copolymerized certainly and its carboxyl group exists in an acid form. The content of carboxylic component in Polymer 7 was 4.8 mole % as determined by oxygen analysis.

Tm and Tg of Polymer 7 were 281° C. and 83° C., respectively. Its η* was 150 poises.

EXAMPLE 8

Polymerization and after-treatment were conducted in exactly the same manner as in Example 3 except that 2,4-dichlorobenzoic acid was used instead of 3,5-dichlorobenzoic acid, thereby obtaining a polymer (Polymer 8) as white granules. The yield was found to be 60%.

In an infrared absorption spectrum on Polymer 8, an absorption was observed near 1700 cm$^{-1}$. By ion chromatography, calcium was detected only by 70 ppm.

From these results, it was confirmed that 2,4-dichlorobenzoic acid is copolymerized certainly and its carboxyl group exists in an acid form. The content of carboxylic component in Polymer 8 was 2.4 mole % as determined by oxygen analysis.

Tm and Tg of Polymer 8 were 278° C. and 80° C., respectively. Its η* was 160 poises.

EXAMPLE 9

A titanium-lined autoclave was charged with 1500 g of NMP, 504 g (3.00 moles, water content: 53.6 wt. %) of hydrated sodium sulfide and 50 g (0.67 mole) of calcium hydroxide. After the autoclave being purged with nitrogen, the contents were gradually heated up to 200° C. to distill off 560 g of an NMP solution containing 190 g of water, and 0.06 mole of hydrogen sulfide. Thereafter, 384 g (2.61 moles) of p-dichlorobenzene, 72 g [0.38 mole; in this case, equivalent ratio of calcium/carboxylic acid in the reaction system: 3.58] of 2,5-dichlorobenzoic acid and 500 g of NMP were fed (water content/sodium sulfide: 1.5 moles/mole) to react the contents for 5 hours at 220° C. Thereafter, 180 g (9.99 moles) of water was further introduced under pressure, and the resultant mixture was heated to 255° C. to react them for 4 hours.

The resulting reaction mixture was after-treated in the same manner as in Example 1, thereby obtaining a polymer (Polymer 9) as white granules. The yield was found to be 65%.

In an infrared absorption spectrum on Polymer 9, an absorption was observed near 1700 cm$^{-1}$. By ion chromatography, calcium was detected only by 90 ppm. From these results, it was confirmed that 2,5-dichlorobenzoic acid is copolymerized certainly and its carboxyl group exists in an acid form. The content of carboxylic component in Polymer 9 was 9.9 mole % as determined by oxygen analysis.

Tm and Tg of Polymer 9 were 282° C. and 80° C., respectively. Its η* was 10 poises.

We claim:

1. A process for the production of a granular poly(arylene thioether) copolymer by reacting an alkali metal sulfide with a dihalo-aromatic component in a polar solvent containing water, which comprises using, as the dihalo-aromatic component, 98-70 mole % of a dihalo-aromatic compound free of any carboxyl group and 2-30 mole % of a dihalo-aromatic carboxylic acid containing 1-2 carboxyl groups, and performing polymerization by adding the dihalo-aromatic carboxylic acid to a polymerization reaction system in accordance with one process selected from the following processes:

(1) at least 50 mole % of the dihalo-aromatic carboxylic acid is converted into an alkaline earth metal salt prior to its addition to the polymerization reaction system, and the amount of the dihalo-aromatic carboxylic acid which is not converted into an alkaline earth metal salt and is added to the reaction system is less than 2 mole % of the dihalo-aromatic component;

(2) at least one compound selected from the group consisting of the hydroxides and oxides of alkaline earth metals is added together with the dihalo-aromatic carboxylic acid to the polymerization reaction system, wherein the alkaline earth metal compound is added to the reaction system in a stoichiometric amount sufficient to convert at lest 50 mole % of the dihalo-aromatic carboxylic acid into an alkaline earth metal salt and the amount of the dihalo-aromatic carboxylic acid which is not converted into an alkaline earth metal salt in the reaction system is less than 2 mole % of the dihalo-aromatic component; and (3) at least one compound selected from the group consisting of the hydroxides and oxides of alkaline earth metals is added to the reaction system together with a mixture of a preformed alkaline earth metal salt of a portion of the dihalo-aromatic carboxylic acid, and the remainder of the dihalo-aromatic carboxylic acid, wherein the alkaline earth metal compound is added to the reaction system in a stoichiometric amount such that at least 50 mole % of the charged dihalo-aromatic carboxylic acid will be converted into an alkaline earth metal salt in the reaction system and the amount of the dihalo-aromatic carboxylic acid which is not converted into an alkaline earth metal salt in the reaction system is less than 2 mole % of the dihalo-aromatic component.

2. The process as claimed in claim 1, wherein the dihalo-aromatic component is reacted in a proportion of 0.7-1.3 moles per mole of the alkali metal sulfide.

3. The process as claimed in claim 1, wherein the polymerization is conducted in at least the following two steps:

(a) conducting a reaction in the presence of water in a proportion of 0.5-2.4 moles water per mole of the alkali metal sulfide charged and at a temperature of 180°-235° C. until the conversion of the dihalo-aromatic component becomes 50-98 mole %; and (b) adding water to provide a water content of 2.5-7.0 moles water per mole of the alkali metal sulfide charged, and raising the temperature to 245°-290° C. to continue the reaction.

4. The process as claimed in claim 1, wherein after the polymerization reaction, the resulting copolymer is washed with acidic or neutral water.

5. The process as claimed in claim 2, wherein after the polymerization reaction, the resulting copolymer is washed with acidic or neutral water.

6. The process as claimed in claim 3, wherein after the polymerization reaction, the resulting copolymer is washed with acidic or neutral water.

7. The process as claimed in claim 1, wherein the granular copolymer can be captured on a 100 mesh screen.

* * * * *